United States Patent

[11] 3,599,758

| [72] | Inventor | Gary E. Bishop<br>Warren, Mich. |
|---|---|---|
| [21] | Appl. No. | 884,453 |
| [22] | Filed | Dec. 12, 1969 |
| [45] | Patented | Aug. 17, 1971 |
| [73] | Assignee | General Motors Corporation<br>Detroit, Mich. |

[54] DISC BRAKE CALIPER
3 Claims, 3 Drawing Figs.

[52] U.S. Cl. .................................................. 188/73.4,
188/72.4, 188/73.6
[51] Int. Cl. ...................................................... F16d 55/224
[50] Field of Search........................................... 188/72.1,
72.2, 72.4, 72.5, 72.6, 73.4, 73.3, 73.6

[56] References Cited
UNITED STATES PATENTS

| 3,194,351 | 7/1965 | Swift | 188/73.6 X |
| 3,532,192 | 10/1970 | Falk | 188/73.4 |

*Primary Examiner*—George E. A. Halvosa
*Attorneys*—W. E. Finken and D. D. McGraw ABSTRACT: A disc brake having a caliper assembly formed of a generally C-shaped member slidably mounted by a tongue-and-groove arrangement on a support bracket, a separate hydraulic cylinder assembly, and a pair of friction pad assemblies mounted on the C-shaped member by means of spring clips which require no close tolerances. One C-shaped member is provided for a series of brakes of different capacities, with different capacity hydraulic cylinder units being provided to fit the one C-shaped housing.

PATENTED AUG 17 1971
3,599,758
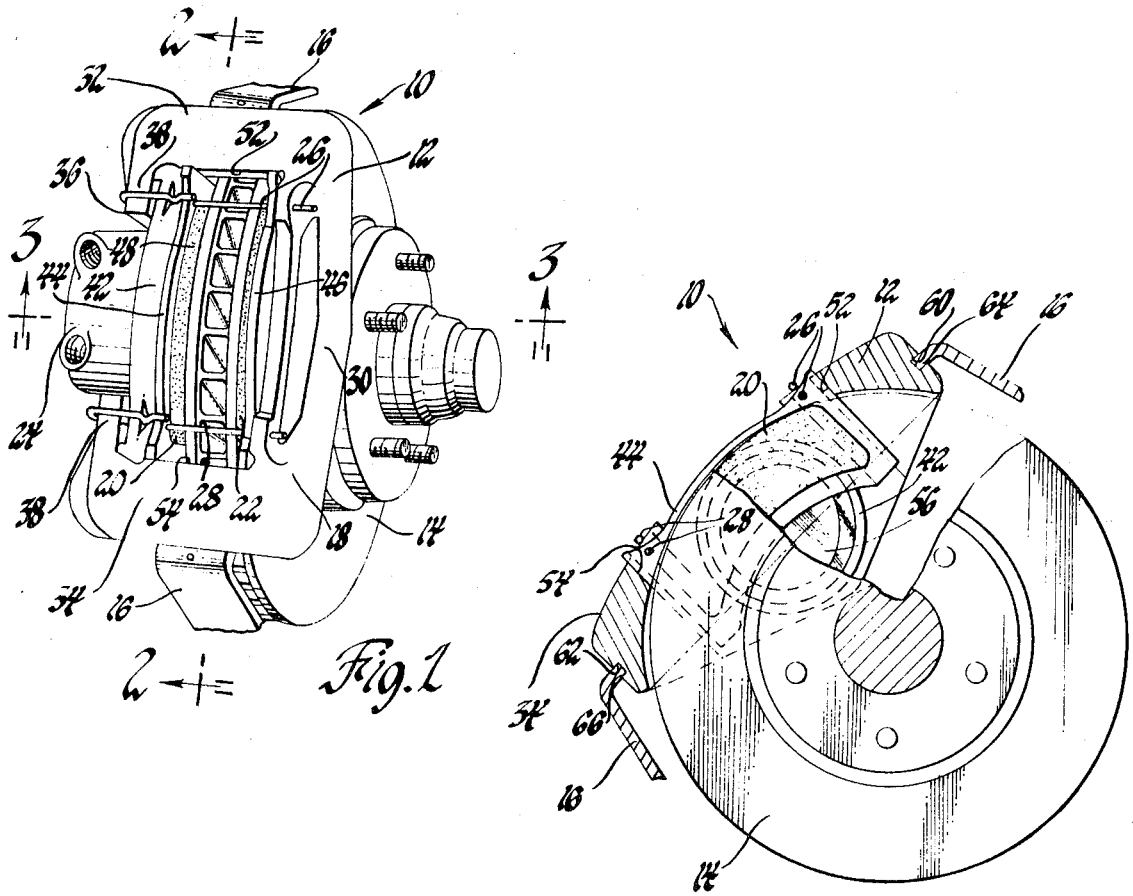
Fig.1
Fig.2
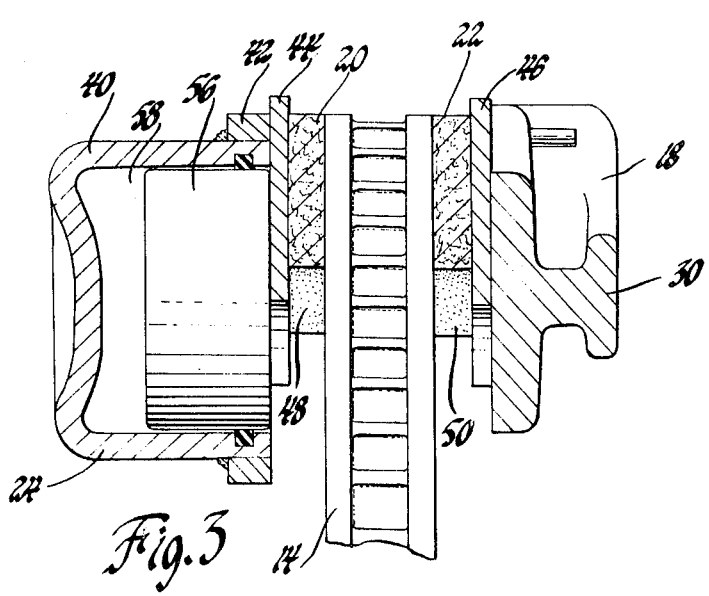
Fig.3
INVENTOR.
Gary E. Bishop
BY
D. D. McGraw
ATTORNEY

DISC BRAKE CALIPER

The invention relates to disc brakes, and more particularly to disc brake assemblies of the sliding caliper type in which a sliding caliper housing member provides for separately mounting the hydraulic cylinder and the friction pad assemblies. The construction embodying the invention permits the elimination of critically torqued fasteners, as well as brake shoe and caliper support pins. The caliper assembly is made of relatively few parts and these parts require a minimum amount of machining. The parts may be readily cast without requiring cores. Worn brake linings may be easily replaced. A series of brakes of different capacities may be provided by having a series of hydraulic cylinder units of different capacities which fit a common C-shaped housing member. The friction pad assemblies engaging opposite sides of the disc are of identical construction, thereby simplifying manufacture as well as assembly.

IN THE DRAWING

FIG. 1 is a perspective view of a disc brake assembly embodying the invention, with parts broken away.

FIG. 2 is a cross section view of the disc brake assembly of FIG. 1, taken in the direction of arrows 2-2 of that figure, and having parts broken away.

FIG. 3 is a section view of the disc brake assembly of FIG. 1, taken in the direction of arrows 3-3 of that figure, and having parts broken away.

The brake assembly 10 includes a caliper assembly 12, the rotatable member 14 to be braked and illustrated as a disc, and a brake caliper support bracket 16. The caliper assembly 12 is mounted chordally about the disc 14 and includes a C-shaped member 18, inboard and outboard friction pad assemblies 20 and 22, a wheel cylinder unit 24, and spring clips 26 and 28. The C-shaped member 18 has a main section 30 positioned along one side of the disc 14 and joining the transverse end sections 32 and 34, which extend transversely across the disc 14. The transverse end sections are each provided with stub ends 36, 38 positioned on the other side of disc 14 from the main section 30 and extending generally parallel to the main section 30 toward each other. The stub ends are spaced apart so that the cylinder housing 40 of the wheel cylinder unit 24 is positioned between the ends. A flange 42 is provided as a part of wheel cylinder unit 24 and has the cylinder housing 40 attached to it. Flange 42 is positioned adjacent the stub ends 36 and 38 and between these stub ends and the brake inboard friction pad assembly 20. The brake friction pad assemblies are formed with backing plates 44 and 46 to which brake linings 48 and 50 are suitably secured. The brake friction pad assemblies have their linings relatively positioned to engage opposite sides of disc 14 in braking relation. The ends of the backing plates 44 and 46 engage suitably machined abutment surfaces 52 and 54 formed on transverse end sections 32 and 34, respectively. This abutting engagement arranges for transfer of brake reaction forces from the friction pad assemblies to the C-shaped member 18 and then to the support bracket 16. The support bracket is suitably fixed to a nonrotatable portion of the vehicle in which the brake assembly is installed, in any suitable manner as is well known in the art.

The stub ends 36 and 38, flange 42, backing plates 44 and 46, and the C-shaped member main section 30 are provided with aligned openings which receive spring clips 26 and 28. These clips hold the wheel cylinder unit and the friction pad assemblies in the proper position radially of the disc 14, and are not required to carry any braking loads. The spring clips may fit freely within the aligned openings so that no close tolerances are required. They are readily removable to permit the removal and replacement of the friction pad assemblies. The wheel cylinder unit may also be replaced without requiring removal of the C-shaped member 18 from the support bracket 16.

When the brake is assembled, the wheel cylinder piston 56 is in engagement with the backing plate 44 of the inboard friction pad assembly. When hydraulic pressure is applied in the cylinder chamber 58, piston 56 moves outwardly to exert force on pad assembly 20 to engage the lining 48 with one side of the disc 14. Hydraulic reaction force acts through the cylinder housing 40 and the flange 42 against the stub ends 36 and 38 to move the C-shaped member 18, and particularly its main section 30, toward the disc 14. This forces friction pad assembly 22 into braking engagement with the other side of disc 14.

The only portions of the C-shaped member 18 which must be machined are the slots 60 and 62 in which the arms 64 and 66 of support bracket 16 fit for mounting the caliper in sliding relation to the disc, and the abutment surfaces 52 and 54. The piston 56 and the cylinder wall of housing 40 must also be machined. The caliper assembly structure may be made without requiring casting cores, thus simplifying the foundry production and decreasing manufacturing costs.

What I claim is:

1. In a disc brake assembly having a rotatable member to be braked and a fixed caliper support bracket, a caliper assembly comprising:

a generally C-shaped housing member extending chordally about said rotatable member and having a main section joining two transverse end sections, each of said transverse end sections having a stub end extending in parallel relation to said main section and said stub ends extending toward each other;

a wheel cylinder unit including a cylinder housing positioned intermediate said stub ends on one side of said rotatable member, a mounting flange on said cylinder housing extending parallel to and adjacent said stub ends and within the C-shaped housing member, and piston means in said cylinder hydraulically actuatable to move and exert force toward said main section;

a pair of friction brake pad assemblies having backing plates and friction lining material secured thereto, one of said pad assemblies being positioned with its backing plate engaging said main section and the other of said pad assemblies being positioned with its backing plate adjacent said flange and operatively engaged by said piston means, said rotatable member being positioned between said pad assemblies in friction braking relation with said friction lining material, said fixed caliper support bracket having means slidably mounting said generally C-shaped housing member thereon for caliper assembly movement transversely of said rotatable member;

said C-shaped housing member transverse end sections having abutment surfaces engaging the ends of said backing plates for transmitting brake reaction from said pad assemblies through said C-shaped housing member to said fixed caliper support bracket;

said stub ends and said flange and said backing plates and said main section having aligned openings receiving wire spring clips therethrough which hold said caliper assembly in assembled relation and which upon removal permit removal and replacement of said pad assemblies.

2. The caliper assembly of claim 1 in which said C-shaped housing member is common for a series of caliper assemblies of different capacity and said wheel cylinder unit is one of a series of such units of different capacities, all of said series of wheel cylinder units fitting said C-shaped housing member.

3. The caliper assembly of claim 1 in which said wheel cylinder unit mounting flange has the ends thereof engaging said C-shaped housing member transverse end section abutment surfaces and is slidable radially relative thereto upon removal of said clips for removal and replacement of said wheel cylinder unit with said C-shaped housing member remaining mounted on said support bracket.